US009813693B1

(12) United States Patent
Baldwin

(10) Patent No.: US 9,813,693 B1
(45) Date of Patent: Nov. 7, 2017

(54) ACCOUNTING FOR PERSPECTIVE EFFECTS IN IMAGES

(71) Applicant: Amazon Technologies, Inc., Reno, NV (US)

(72) Inventor: Leo Benedict Baldwin, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 536 days.

(21) Appl. No.: 14/317,889

(22) Filed: Jun. 27, 2014

(51) Int. Cl.
*H04N 13/02* (2006.01)
*G06T 7/00* (2017.01)
*G06T 7/60* (2017.01)
*H04N 5/232* (2006.01)

(52) U.S. Cl.
CPC ....... *H04N 13/0271* (2013.01); *G06T 7/0075* (2013.01); *G06T 7/60* (2013.01); *H04N 5/23296* (2013.01)

(58) Field of Classification Search
CPC ............ H04N 13/0271; H04N 5/23296; G06T 7/0075; G06T 7/60
See application file for complete search history.

(56) References Cited

U.S. PATENT DOCUMENTS

| 2011/0090344 A1* | 4/2011 | Gefen | G06T 7/248 348/169 |
| 2011/0157404 A1* | 6/2011 | Shiohara | H04N 5/23212 348/222.1 |
| 2012/0249792 A1* | 10/2012 | Wilborn | H04N 5/23254 348/148 |
| 2014/0098264 A1* | 4/2014 | Koike | H04N 5/262 348/240.99 |
| 2016/0150070 A1* | 5/2016 | Goren | H04W 48/04 455/404.2 |
| 2016/0189421 A1* | 6/2016 | Haimovitch-Yogev | G06T 15/205 345/626 |

* cited by examiner

*Primary Examiner* — Tat Chio
(74) *Attorney, Agent, or Firm* — Polsinelli LLP

(57) ABSTRACT

Images captured at short distances, such as "selfies," can be improved by addressing magnification and perspective effects present in the images. Distance information, such as a three-dimensional depth map, can be determined for an object using stereoscopic imaging or another distance measuring approach. Based on a magnification function determined for a camera lens, magnification levels for different regions of the captured images can be determined. At least some of these regions then can be adjusted or transformed in order to provide for a more consistent magnification levels across those regions, thereby reducing anamorphic effects. Where appropriate, gaps in the image can also be filled to enhance the image. At least some control over the amount of adjustment may be provided to users for aesthetic control.

18 Claims, 10 Drawing Sheets

ACCOUNTING FOR PERSPECTIVE EFFECTS IN IMAGES

BACKGROUND

As the capabilities of portable computing devices continue to improve, users are increasingly relying on these devices to perform tasks conventionally performed using other devices. For example, users are increasingly using portable computing devices to take pictures of themselves, often to post on social media sites. These images, or "selfies" as they are often called, are generally taken of the user's face or body with the device being held by the user, such that the camera is generally within arm's length at the time of image capture. This relatively short distance can lead to distance-based perspective effects in an image, such as where objects closer to the camera lens can appear to be disproportionally magnified relative to objects further away. These anamorphic effects can result in images that do not accurately represent the appearance of the user, and may not be aesthetically acceptable. In some cases, the user will take a picture in a mirror in order to minimize the anamorphic effects by increasing the effective distance. These images may not be optimal for many reasons. Other approaches involve using mechanical devices that enable the user to hold the portable device at a greater distance, but such approaches require the user to carry and utilize the mechanical device, which will be less than desirable for many users.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to obtaining, processing, and/or displaying image content in an electronic environment. In particular, various embodiments use depth information to dynamically adjust for perspective-based anamorphic effects. For example, images captured at short distances, such as are often referred to as "selfies," can be improved by adjusting magnification and/or perspective effects present in the images. Distance information, such as a three-dimensional depth map, can be determined for an object, represented in an image, using stereoscopic imaging or another distance measuring component or process. Based at least in part on a magnification function determined for a camera lens, for example, magnification (or minification) levels or values for different regions of the captured images can be determined. At least some of these regions then can be adjusted or transformed accordingly in order to provide for a more consistent magnification across those regions, thereby reducing anamorphic effects. For example, a nose or chin of a user in an image can be adjusted by an opposite amount to the disproportionate magnification amount present due to the anamorphosis. Where appropriate, gaps in an image can also be filled to enhance the image. At least some control over the amount of adjustment may be provided to users for aesthetic control or other such purposes.

Various other functions and advantages are described and suggested below as may be provided in accordance with the various embodiments.

Figure 1A:
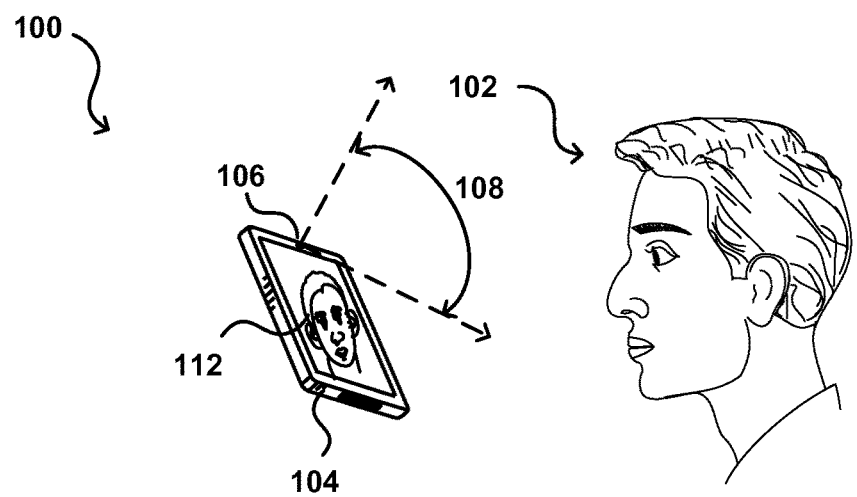
FIGS. 1(a) and 1(b) illustrate an example environment in which a user can capture an image using a portable computing device.
Figure 1B:
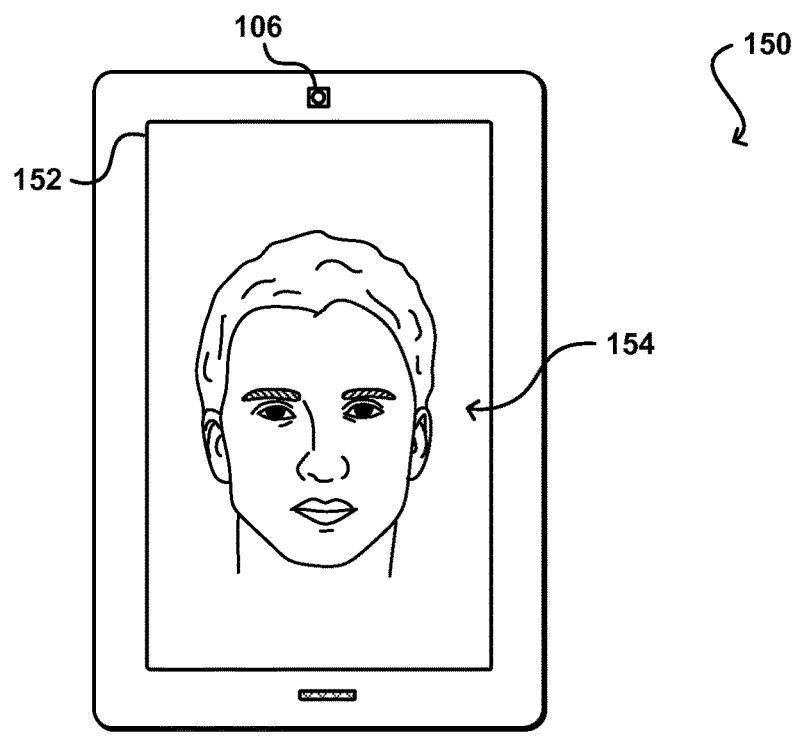

FIG. 1 illustrates an example environment 100 in which aspects of the various embodiments can be implemented. In this example, a user 102 wants to take a self-portrait, often referred to as a "selfie." In order to obtain such an image, the user 102 will typically position himself and/or a computing device 104 such that the desired portion of the user (e.g., a face or body portion) is positioned within an angular capture range 108 of at least one camera 106 of the computing device. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, smart televisions, wearable computers (e.g., smart watches and glasses), portable media players, and digital cameras, among others. In some embodiments the user will use a rear-facing camera on the device, although in this example the user utilizes a front-facing camera on the same side as a display element 112 such that the user can obtain a live view of the information being captured by the camera in order to properly position the device and/or user, as well as to review the resulting image without having to adjust the position of the device. FIG. 1(b) illustrates an example situation 150 wherein the user has captured an image 154 including a representation of the user's head, which can be displayed on the display screen 152 of the device. The user can utilize this image for any of a number of different purposes, such as to use as a profile pic, post to a social network, and the like.

It will often be the case, however, that the image will not accurately represent the user or will be visibly unacceptable to the user due to distance-based perspective effects that can be present in the image. For example, the image 200 in FIG. 2(a) generally represents an image that the user would like to see, such as where the image was taken at a distance with a "normal" (e.g., non-wide-angle) or telephoto lens. A wide-angle lens typically has a field of view of greater than about sixty-two degrees, such as in the range of sixty-four to eighty-four degrees for various lenses, while a normal or standard lens typically has a field of view in the range of about forty degrees to about sixty two degrees, among other such ranges. The overall distance causes differences in distance between features to be small percentages of the overall distance, such as where the distance between a tip of a nose and an ear might be on the order of a couple inches but the distance to the camera is several feet. Thus, any magnification of the nose relative to the ear will be minimal, and magnification differences on the order of a pixel or less might not be noticeable to the user.

Figure 2A:
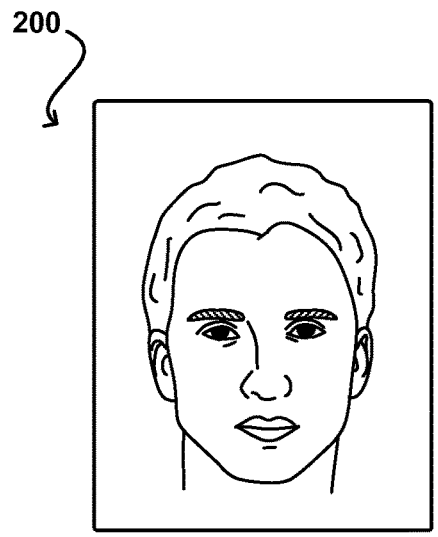
FIGS. 2(a), 2(b), 2(c), and 2(d) illustrate example magnification effects that can be represented in an image captured by a device in an environment such as that described with respect to FIG. 1.
Figure 2B:
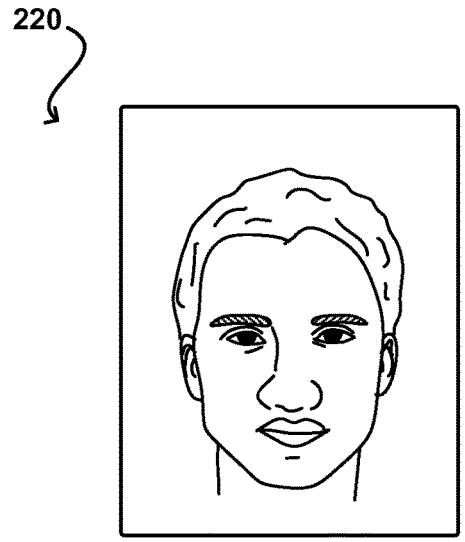

FIG. 2(b) illustrates an example image 220 that might be captured if the user is holding the camera of the device much closer to the face of the user. If, for example, the camera is only twelve inches from the user's face, and the tip of the nose is three inches from a visible portion of the ear, then the difference in visible feature distance is approximately 25% of the distance from the camera to the far feature (ear) location. In such cases, the magnification effect resulting from differences in distance between features can be significant. Other features might be closest to the camera as well, such as may include the chin of the user when capturing image data from a location in front of, but below, the position of the user's face. When comparing the images 200, 220 of FIG. 2(a) and FIG. 2(b), it can be seen that the image 220 captured at a much closer distance has a significant change in appearance of the user, with the user appearing to have a larger nose with a bulbous tip, and smaller ears, among other such changes. These changes can be unappealing to many users.

Figure 2C:
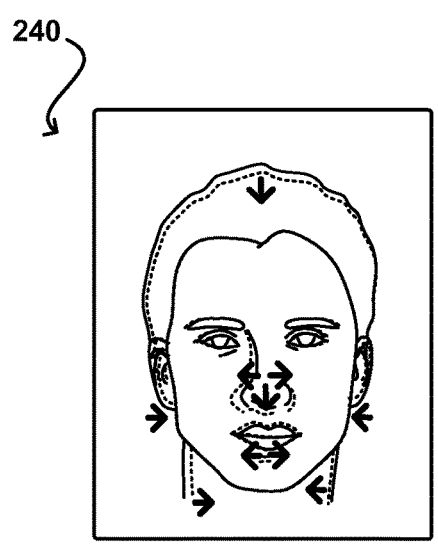

The magnification effect can be explained in part by examining the example image 240 illustrated in FIG. 2(c). In this example, outlines of the user images captured in FIGS. 2(a) and 2(b) are overlaid, with vectors added to clarify the changes between the two outlines. As illustrated, the user feature closest to the camera (the nose) is magnified by the largest amount. Other features relatively close to the camera, such as the lips, are also magnified, but to a lesser extent. Medium range features, such as the user's eyes or forehead, may have little to no relative magnification. Features further away, such as the user's ears, forehead, or neck, may actually show minification, where the features appear smaller than they otherwise would in an image captured at a distance with a telephoto lens which is generally free of perspective effects. Distances known to show, or correspond to, minification can be said to exceed (or at least meet) a minification threshold or satisfy a minification criterion, among other such options.

Figure 2D:
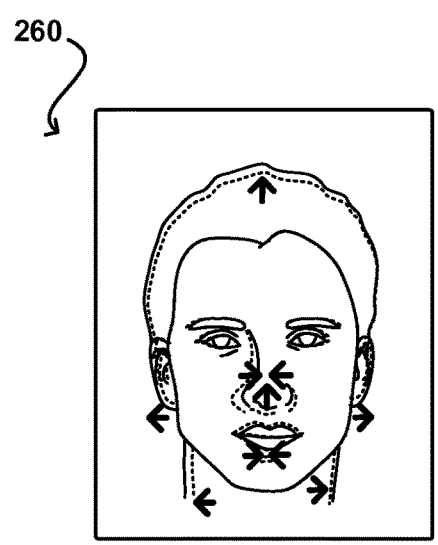

Because the magnification effects are a function of distance, however, the amount of magnification can be mapped or modeled as a function of distance from the camera. The way in which magnification varies with distance can be determined for a particular type of lens, and this information used to adjust images to account for the magnification. For example, in the image 260 of FIG. 2(d) the vectors are effectively reversed from those illustrated in FIG. 2(c). If the distances to various points on the face of the user are known, the amount of magnification for that feature can be determined and any amount of magnification relative to a selected or default magnification removed, or at least minimized, by making an equal and opposite adjustment. As illustrated, such a process can attempt to minimize the size of the user's nose in the image, increase the ear size, etc., based at least in part on the distance to each of these features and the magnification function for the lens used to capture the image.

In order to determine the appropriate amount to adjust each feature, or portion of the image, however, it is necessary in at least some embodiments to determine the distance to each of those features or portions. One way to determine the distance to various features or points is to use stereoscopic imaging, or three-dimensional imaging, although various other distance or depth determining processes can be used as well within the scope of the various embodiments. For any pair of cameras that have at least a partially overlapping field of view, three-dimensional imaging can be performed by capturing image information for one or more objects from two different perspectives or points of view, and combining the information to produce a stereoscopic or "3D" image. In at least some embodiments, the fields of view can initially be matched through careful placement and calibration, such as by imaging using a known calibration standard and adjusting an optical axis of one or more cameras to have those axes be substantially parallel. The cameras thus can be matched cameras, whereby the fields of view and major axes are aligned, and where the resolution and various other parameters have similar values for each of the cameras. Three-dimensional or stereoscopic image information can be captured using two or more cameras to provide three-dimensional point data, or disparity information, which can be used to generate a depth map or otherwise determine the distance from the cameras to various features or objects. For a given camera pair, a stereoscopic image of at least one object can be generated using the respective image that was captured by each camera in the pair. Distances measurements for the at least one object then can be determined using each stereoscopic image.

In an alternative embodiment, a second camera can be paired with a "main" camera, such as a relatively high resolution full color camera, with the main camera and the second camera forming a stereoscopic pair. The second camera may be substantially matched to the first camera in resolution and field of view, or the second camera may be of lower resolution, lower color depth (e.g., panchromatic), and substantially matching field of view. As an example, a high-resolution camera can include auto-focusing elements for use in still image capture or two-dimensional video capture. Each image capture element may be, for example, a camera, a complimentary metal-oxide semiconductor (CMOS) device, a motion detection sensor, or an infrared sensor, or can utilize another appropriate image capturing technology. The electronic device can also include at least one secondary camera for use with the high-resolution camera to provide for stereoscopic imaging. In at least some embodiments, there can be additional cameras as well as may be used with stereo- or multi-viewpoint imaging, or can be used for other purposes such as gesture recognition or motion control. In at least some embodiments, the secondary cameras do not have focusing elements, and have a smaller device footprint and lower resolution (e.g., 2.0 MP or less) than the high resolution camera. The locations, types, and combinations of these secondary cameras can vary between embodiments as should be apparent in light of the present disclosure. Also, similar or alternative secondary cameras can be used on the front of the device with the front-facing camera as well in at least some embodiments.

For any pair of these cameras that has at least a partially overlapping field of view, stereoscopic imaging can be performed by capturing image information for one or more objects from two different perspectives or points of view, and combining the information to produce a 3D image. In at least some embodiments, the fields of view (or other aspects) of the cameras can be matched through careful placement and calibration, as well as by manipulating the focal lengths for each camera as discussed elsewhere herein. Methods for producing a 3D image using image information from different perspectives are well known in the art and will not be described in detail herein. Example approaches include calculating an amount of disparity through a process such as edge matching, color matching, and/or texture matching, and combining the disparity information with color information from each perspective to generate a stereoscopic image, either before or at a time of display. For example, if the image information is matched then the image information can be combined and/or displayed directly on a 3D-capable display, wherein the human brain can effectively do at least some of the 3D processing. In other examples, the image information can be otherwise combined or processed at the time of display such that upon displaying the information a 3D image is generated. Using a device with disparate camera types, however, can present challenges in producing a high quality 3D image. For example, a high resolution camera and smaller, less expensive, low resolution camera can have multiple aspects that are mismatched, in addition to the size and resolution. These can include, for example, the field of view, the aperture, and the depth of focus, as well as various aberrations, distortions, or other variations.

The difference in resolution can be handled in a relatively straightforward manner, as the resolution of the lower resolution camera can be used for both cameras, with a depth map being generated using the lower resolution and color and intensity values being mapped from the larger resolution camera. For any edge positions visible only from the lower resolution camera (i.e., due to differences in perspective between the cameras), one or more image processing algorithms can be used to smooth out or otherwise improve the quality of the image at those locations. In at least some embodiments, the higher resolution camera can be operated in a lower resolution mode, using approaches known for various conventional cameras. If the low resolution camera also has smaller pixels, various other adjustments might need to be accounted for in software and/or hardware, including adjustments to the sensitivity and/or dynamic range of at least one of the cameras or images produced by at least one of the cameras.

Various optical properties of the two cameras can also be made to be relatively similar. For example, the fields of view can be matched within the production tolerance of the lenses and the amount of light transmitted can be matched as well. In certain embodiments the amount of light transmitted by the camera lenses is not matched, but rather the sensitivity of the camera systems. In such a situation, the transmission of the lens combined with the sensitivity of the imager can be matched.

A potentially more difficult problem, however, results from the fact that lenses of different sizes or shapes can have significantly different depths of focus. For inexpensive cameras with relatively small lenses, the depth of focus can be quite large such that a focusing element is not necessary for many different situations. For larger imaging format cameras (i.e., larger physical dimensions with higher resolution), however, the lens element(s) might have a very small depth of focus, such that the camera needs to be focused quite accurately on the object of interest, and objects that are even a slight bit closer or further away from the camera can quickly be out of focus. When using a smaller format and a larger format camera for stereoscopic imaging, a problem can arise in that the different depths of focus can result in objects (particularly background objects) that are in focus in the image from one perspective but out of focus in the image from the other perspective. This difference can result in different amounts of blur between the images, which can result in false disparity in the z-map or contours of the resulting 3D image.

One of the factors leading to the differences in depth of focus is the way in which apertures scale for cameras and/or lenses of different sizes. Apertures are typically measured in f-stops, which generally refer to relative fractions of the focal length of the lens. A smaller number f-stop, such as f/2.0, refers to a wider aperture, while a larger number f-stop, such as f/22, refers to a smaller aperture. A small camera having an aperture of f/11 or higher will generally produce images in which almost all the objects in the image are in focus, while a larger camera with an aperture of, for example, f/2.8 might have such a short depth of focus that the eyes of a person in an image might be in focus but the hair further back on the sides of that person's head might be out of focus. Apertures work differently with different size lenses and cameras, however, so it is not as simple as utilizing the same aperture for both cameras.

An approach in accordance with various embodiments addresses at least these differences by attempting to match the depth of focus for each of the stereo imaging cameras through setting of the apertures for the cameras. In at least one embodiment, a determination is made as to a preferred depth of focus for the cameras, as may be based on desired imaging capabilities, anticipated use (e.g., close-up portraits or outdoor use), and/or other such factors. In at least some embodiments, selecting a desired depth of focus results in a larger aperture being used with the smaller camera than might otherwise be used and/or a smaller aperture on the larger camera. In one example, a smaller camera has an f/2.0 aperture and a larger camera has an f/2.8 or f/3.2 aperture, depending upon factors such as the dimensions of the respective cameras.

In a more detailed example, the format of the larger camera is 1.6 times larger than the small camera. Even in a case where the format difference is mitigated by an effective pixel that is 1.6 times larger, the focal ratio of the larger camera is calculated to advantageously utilize around three times the focal ratio of the smaller camera (e.g., f/1.4 with respect to f/4.2). Such differences are calculated based on an object distance of 100 mm and matching depths of field.

In particular, the larger camera module in this example has an 8 MP resolution in a 1/3.2" format (dimensions of 4.57 mm×3.427 mm, 5.712 mm diagonal, and a resolution of 3264×2448), including 1.4 µm pixels with a lens that provides a 60° field of view (diagonal). For a 60° field of view for this camera module, the required focal length is on the order of around 5 mm. The lens for the camera operates at an aperture of f/2.4. To calculate the depth of field (the range of acceptable focus in object space) for a distance of 10 cm, for example, the depth of focus (the range of acceptable focus in image space) is first calculated at a finite object distance, as depth of focus is infinite at infinity. In at least one example, the depth of focus can be given by:

$$t=2Ncv/f$$

where N is the focal ratio, c is the circle of confusion, v is the object distance, and f is the focal length. The circle of confusion in this example can be taken as pixel pitch (e.g., distance from edge to edge or center to center of adjacent pixels), although other approximations can be used in other embodiments. While the number will change for different values, the overall ratios will not change. Using values N=2.4, c=1.4, v=100×10³, and f=5×10³ (all in microns), the depth of focus is 134 microns. This must be projected into the field, which is in object space. To do that, the linear magnification is calculated, which is equal to the lateral magnification squared. Lateral magnification is the ratio of the size in object space to the size in image space, given by:

$$M=f/(f-d)$$

where f is the focal length and d is the object distance. In this case, f=5, d=100, and m=−0.0526x, where the negative indicates that the image is inverted. As a result, the lateral magnification m²=0.00277, with the resulting depth of field being 48.5 mm.

A similar determination can be made for the smaller format camera module. In this example, a 2 MP companion camera has a ⅕" format (dimensions of 2.842 mm×2.121 mm, 3.546 mm diagonal, and a resolution of 1600×1200) with 1.75 μm pixels and a lens that yields a 60° field of view (diagonal). For a 60° FOV, a desired focal length can be calculated to be on the order of about 3 mm. If the lens operates at an aperture of f/2.4, using the above formula for depth of focus and values of N=2.4, c=1.75, v=100×10³, and f=3×10³ (all in microns), then the depth of focus is 280 microns. The lateral magnification then is given by 0.000957, such that the depth of field is 293 mm or about six times the depth of field of the other camera.

For stereo imaging, the larger image can be sub-sampled or otherwise processed down to the same resolution as the smaller camera. The sub-sampling can change the effective pixel size of the camera from 1.4 μm to 2.8 μm. Scaling from 8 MP to 2 MP requires binning pixels in 2×2 blocks or skipping every other pixel, effectively doubling the pixel pitch in each dimension. Using N=2.4, c=2.8, v=100×10³, and f=5×10³ (all in microns), the depth of focus is 269 μm and the depth of field is 97 mm, which is still on the order of about three times less than that of the smaller camera. This has implications for using these two cameras as a stereo pair, as objects that are out of focus in the image from the 8 MP camera, even after scaling to 2 MP, will be in focus in the 2 MP camera. This difference can give rise to spurious disparities in the stereo disparity image. A solution to this problem is to scale the focal ratio of the cameras. Factors to be considered include the ratio of the formats and the ratio of the pixel sizes. The depth of focus is proportional to each of these factors. The triple amount of disparity is too great to overcome by changing one camera in this example.

The small camera at f/1.4 gives a depth of field of 170.8 mm at 100 mm. Scaling the aperture of the larger camera module to account for both the larger imager and the larger effective pixel pitch by a factor of three times gives a focal ratio of f/4.2 and a depth of field of 169.9 mm at 100 mm, which is sufficiently close to the 170.8 mm depth of field of the smaller camera. Using the more usual f/4.0 for the large camera could give a depth of field of about 162 mm at 100 mm, which might be sufficient for at least some applications.

Figure 3A:
FIGS. 3(a), 3(b), 3(c), and 3(d) illustrate variances in disparity with distance that can be utilized in accordance with various embodiments.
Figure 3B:
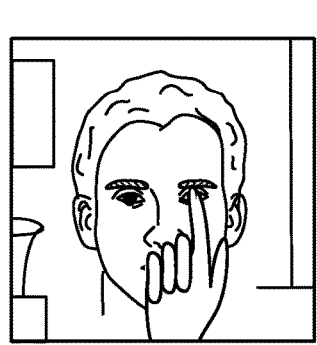

FIGS. 3(a) through 3(d) illustrate approaches for determining disparity and distance data using captured images that can be utilized in accordance with various embodiments. For example, FIGS. 3(a) and 3(b) illustrate images 300 and 320 that can be captured using a pair of stereoscopic cameras of a computing device. In various embodiments, a pair of cameras may capture images simultaneously or in very close temporal proximity to one another. As a result, the captured images can include at least some matching points of interest. For example, a user's finger, nose, eyes, eyebrows, lips, environmental features, or other features may be detected in both images by using various techniques discussed herein or otherwise known for such purposes. Since each image is captured using a camera at a slightly different location, the position of objects in each image will be different. As an example, if one were to overlay one of these images 300 and 320 on top of the other, as illustrated in the example image 340 of FIG. 3(c), it can be seen that each of the objects is slightly offset, with objects (or portions of objects) closer to the camera being more offset than others, due primarily to disparity differences. When displayed and/or viewed as a three dimensional image, however, the disparity causes the objects in the image to appear to be located at different depths.

Figure 3C:

FIG. 3(c) illustrates an example combination image 340 showing the relative position of various objects, or portions of objects, in the captured images 300 and 320 if those images were "overlaid" or "superimposed." This illustrates the amount of disparity, or lateral offset, between objects in the captured images. Objects represented in the image that are closer to the device, e.g., the finger or hand, have relatively large amounts of disparity. Objects represented in the image that are further away from the device, e.g., the painting on the wall, have relatively small amounts of disparity. Objects between these two areas will have intermediate amounts of disparity based upon the relative distance of those objects from the cameras.

Figure 3D:
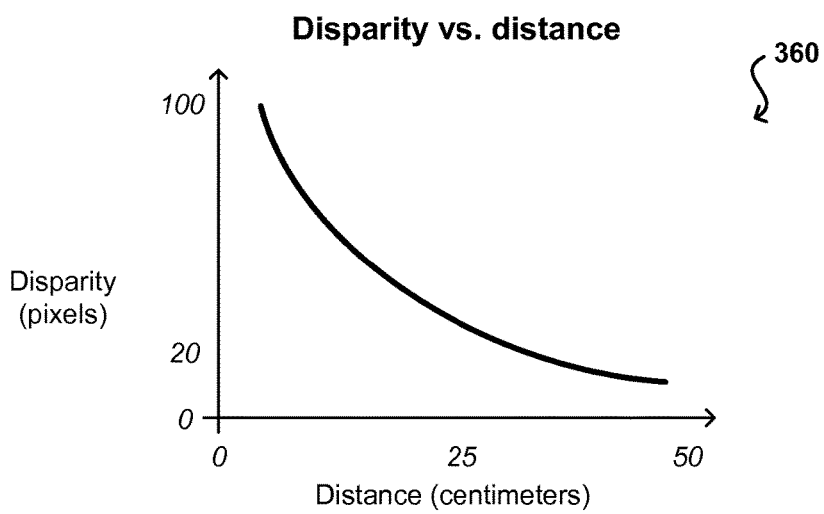

FIG. 3(d) illustrates an example plot 360 showing a relationship of disparity with respect to distance. As illustrated, the amount of disparity is inversely proportional to the distance from the cameras, such that there can be significantly more disparity in the near camera field, e.g., 0 to 1.0 m, than in the far field, e.g., 1.0 m to infinity. Further, the decrease is not linear. However, disparity decreases more quickly near the device than at a distance, as objects in the distance can have little to no disparity regardless of whether they are twenty feet away or a mile away. An approach in accordance with various embodiments can determine the distance between an object or feature and the device based on the amount of stereo disparity for the object between two images captured by the pair of cameras. For example, a user's face looking at a smart phone might typically be located within 50 centimeters from the device. By examining the disparity relationship curve 360 or relationship, the computing device, or an application or user of the device, can determine that the amount of disparity at fifty centimeters for the configuration parameters of the current device, e.g., camera resolution, camera separation, or field of view is twenty five pixels of separation between images. Using this information, the device can analyze matching feature points, e.g., nose, eyes, or fingertips, in the stereo images, and determine the approximate distance between those feature points and the computing device. For example, the amount of disparity, D, at a given distance, z, can be represented by the relationship:

$$D = \frac{f * B}{z}$$

where f is the focal length of each of the matched cameras and B is the baseline, or distance between the viewpoints of the cameras based at least in part upon their relative positions and separation. In this example, if the focal length of a camera is the equivalent of four hundred pixels and the baseline is five centimeters, for a distance of one meter the disparity would be twenty pixels. Based on relationships such as this one, the computing device may be able to determine the distance between the object of interest and the device. Various other approaches can be utilized as well as should be apparent to one of ordinary skill in the art in light of the teachings and suggestions contained herein. For example, other approaches for determining a distance between an object of interest and the device can include using time-of-flight cameras or structured light cameras. A time-of-flight camera is a range imaging camera system that determines a distance of an object from the camera based on the known speed of light. For example, the camera can measure the time-of-flight of a light signal between the camera and the object for each point of an image of the object. A structured light camera is a three-dimensional scanning device used for measuring the three-dimensional shape of an object using projected light patterns and a camera.

Figure 4A:
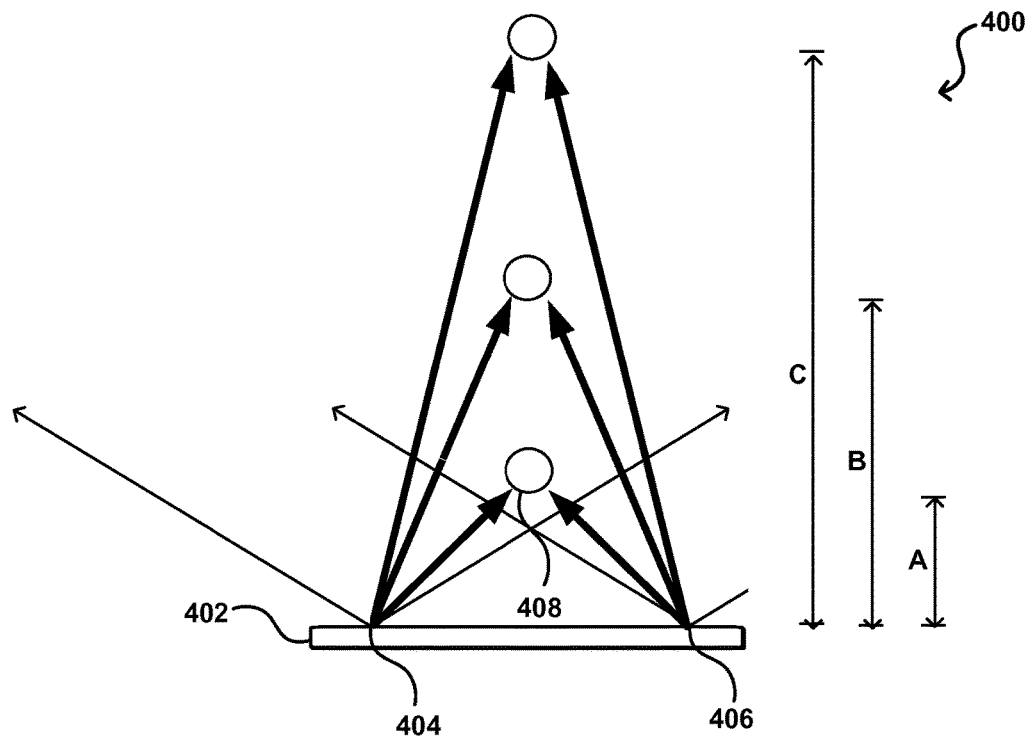
FIGS. 4(a) and 4(b) illustrate variances in disparity with distance that can be utilized in accordance with various embodiments.
Figure 4B:
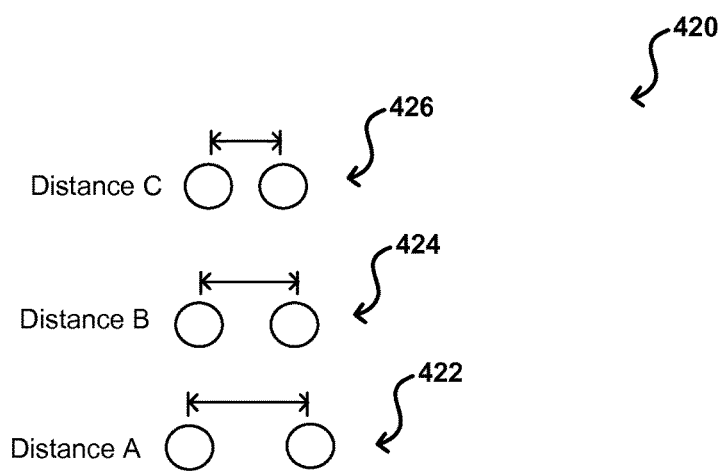

FIGS. 4(a) and 4(b) provide another illustration as to how disparity varies with distance. In the example 400 of FIG. 4(a), an object 408 has image information captured by a pair of cameras 404, 406 of a computing device 402 at three different distances A, B, and C. Example rays from the center of each camera to the object are displayed at each distance. As can be seen, the rays approach horizontal (in the plane of the figure) as the object gets closer to the cameras, meaning that the object will appear closer to an edge of an image captured by either camera. Similarly, as the object 408 gets farther away, such as at position C, the rays get closer to vertical, or closer to parallel with each other, meaning that the object will appear closer to the center of each image, or closer to the same position in each image (for off-center objects). For objects that are sufficiently far away, those objects can appear in substantially the same location in each image. FIG. 4(b) illustrates example separations or disparities 422, 424, 426 that could be expected for each of distances A, B, and C, respectively, showing a decrease in offset with an increase in distance. When the cameras are sufficiently aligned and rectified, such that the primary axes of the camera sensors (orthogonal to the primary plane of the respective sensor) are sufficiently parallel, the disparity information can be used to determine the distance to an object. For example, the amount of disparity 424 for an object in stereoscopic image data can indicate that the object is at a distance of B if the cameras are sufficiently aligned.

Figure 5A:
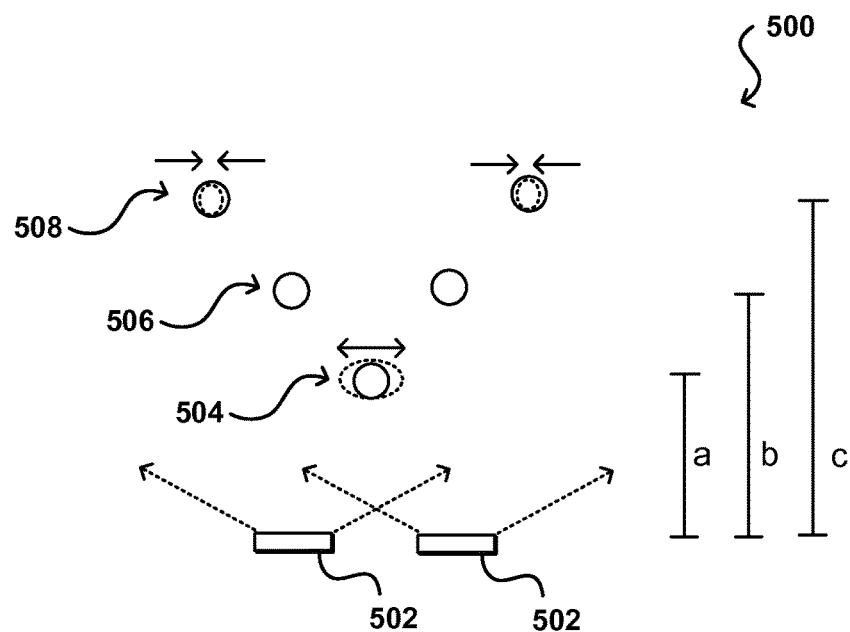
FIGS. 5(a) and 5(b) illustrate magnification effects as a measure of distance that can be accounted for in accordance with various embodiments.

As discussed, distance can also impact the magnification of objects at different distances. For example, consider the situation 500 illustrated in FIG. 5(a). In this example, the objects 504, 506, 508 are at distances (a, b, and c, respectively) that are sufficiently close to a pair of stereo cameras 502 such that different magnification levels are apparent for each object. As opposed to disparity, which compares the relative location of the representation of each object in the images captured by each of the stereo cameras, the magnification effect would be apparent in each image captured by each of the stereo cameras (assuming an object is at a distance where magnification effects are observable, etc.). For example, when an object 504 is at the closest distance a, that there is a magnification effect that causes the object 504 to appear slightly larger in an image captured by either of the cameras 502. An object 506 at a second distance b may have little to no magnification effect. An object 508 at a further distance 508 might actually have a slight minification effect whereby that object can appear to be smaller relative to the other objects 504, 506. As discussed, the magnification and/or minification effects may only be visible for objects that are near the cameras (e.g., within an anamorphic effect threshold) and have a significant percentage difference in distance with respect to each other. Once objects are beyond the anamorphic effect threshold, which can depend at least in part upon the properties of the camera lens, those objects can appear to have the same magnification or minification effect, and thus can appear to have the proper aspect ratio with respect to the other objects represented in an image captured using that camera lens.

Because the magnification effects are based primarily on the properties of the camera lens, and those properties do not change appreciably over time, it is possible to determine the amount of magnification or minification that should be expected at certain distances or over certain ranges of distance. Thus, a magnification function can be determined for a given lens, such that the expected magnification effect for a given distance can be determined using the function. By knowing the amount of magnification or minification for a given distance, these effects can be accounted for if the depth to various objects or features can be determined. For example, if a first object is determined to be at a distance that will experience a 10% magnification, that object can be adjusted to have its representation in the image reduced by approximately 10%, in order to cause that object to appear to have the proper size with respect to other objects represented in the image. There will always be scale differences with distance, but such an approach attempts to remove differences that are due primarily to the lens selected.

Figure 5B:
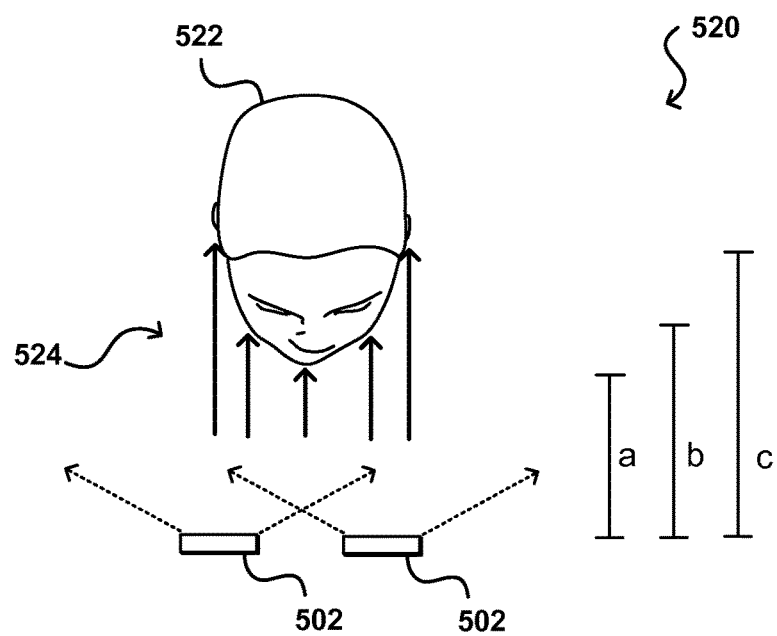
Figure 6A:
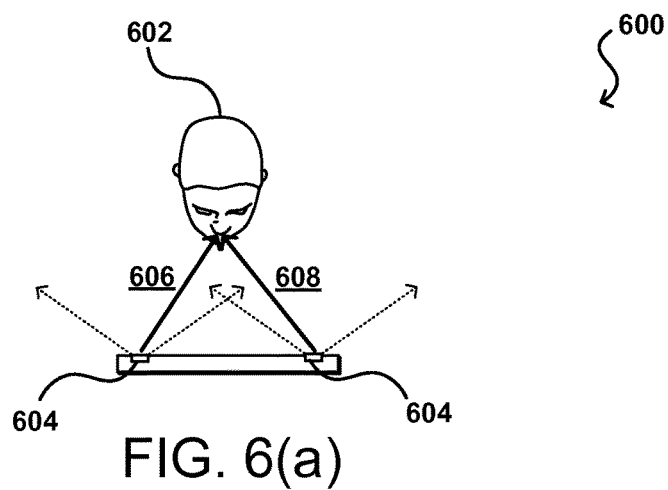
FIGS. 6(a), 6(b), 6(c), and 6(d) illustrate an example approach to determining the distance to various features of a user's face that can be utilized in accordance with various embodiments.
Figure 6B:
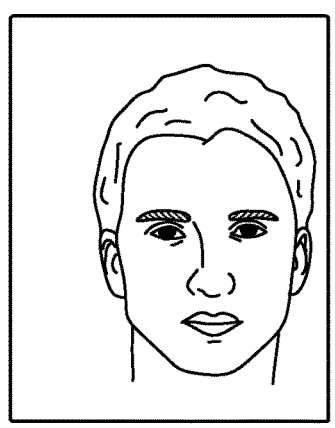
Figure 6C:
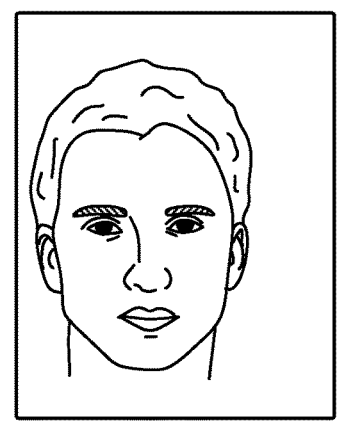
Figure 6D:
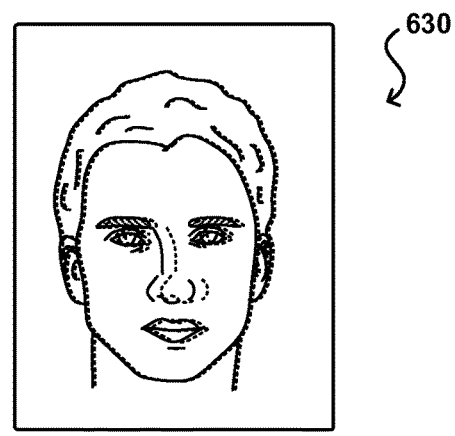

Once a magnification function (or other approach to determining magnification level with distance) is determined for a camera lens, lens system, or lens array, for example, the relative magnification for different objects or features can be determined by determining the distance to each of those objects or features. For example, as illustrated in the situation 520 of FIG. 5(b), a set of stereo cameras 502 (or other such distance mapping system) can generate a depth map or otherwise determine the distance to various objects, or portions or features of an object, represented in the images captured by the pair of cameras. In this example, the images captured by the cameras 502 can be analyzed to determine the distances 524 to various portions of a user's head 522 represented in the images. This can include the tip of the nose at distance a, the cheeks at distance b, and the ears at distance c.

It should be noted, however, that in general there will always be some magnification or minification of an object in an image, as the image will very rarely be the exact same size as the object being represented in the image, will always be captured from a distance, etc. Thus, the magnification levels in at least some embodiments can be determined with respect to a selected, reference, "default", or object magnification level, which corresponds to a reference object distance. In some embodiments, it can be desirable to select the reference object distance or object magnification level dynamically based at least in part upon information for an object in the scene. For example, in FIG. 5(b) the front of a user's head is represented in the image. As discussed, the nose will be magnified relative to the cheeks, which will have a greater magnification than the ears. If the desire is to have the magnification level of all points on the face be relatively similar, then any of these points (corresponding to distances a, b, or c) could be selected as having the default magnification, or being at the reference magnification distance or plane, and all magnifications adjusted to be at that determined level. Selecting the near point as the default plane can result in a significant amount of magnification adjustment, which can result in a corresponding amount of stretching or filling which can potentially degrade the overall quality of the image. Selecting the far point might be somewhat preferred, as there will be compression of data which will likely produce better results, but the amount of magnification adjustment needed may still cause an undesired appearance in the final image. Accordingly, approaches in accordance with various embodiments can attempt to determine a middle distance to use as the default plane, and adjust the other points of the face to that magnification level. Such an approach reduces the range of magnification adjustments to be made, which can potentially result in the most appealing image. Thus, approaches in accordance with various embodiments can utilize the depth map to determine the range of distances of a represented portion of an object in an image, and then determine a magnification level to use for magnification adjustments based upon a middle region of the representation of the object. In some embodiments the selection point can be weighted, such as where only a small portion of the object is very near or far from the camera at the time of image capture, etc.

FIGS. 6(a) through 6(d) illustrate another view of a process for determining the distance to various features or portions of a user's face, for example, in order to generate a depth map. In the example situation 600 of FIG. 6(a), as with the previous example, a pair of stereo cameras 604 captures stereo image data including a representation of a head 602 of a user. Because the cameras are offset with respect to each other, objects up to a given distance will appear to be at different locations in images captured by each camera. For example, the direction 606 to the nose from a first camera is different from the direction 608 to the nose from the second camera, which will result in a representation of the nose being at different locations in images captured by the different cameras. For example, in the image 610 illustrated in FIG. 6(b) the features of the user appear to be to the right in the image with respect to the representations of corresponding features of the user in the image 620 illustrated in FIG. 6(c). The difference in location will vary by feature, as the distance to each of those features will correspond to a respective offset. If the images are overlaid on top of each other and aligned, as illustrated in the example image 630 of FIG. 6(d), it can be seen that features at different distances have different offsets. For example, the nose, which is closest to the camera, has the most amount of offset, or disparity. The amount of disparity can be used to determine the distance from the cameras as discussed elsewhere herein. Features further back such as the eyes and cheeks will have a lower amount of disparity, and features towards the back of the representation of the head, such as the ears or neck, can have the least amount of disparity. Using such an approach to determine the distance to various portions or features of the user's face enables a depth map to be generated which can determine, for each pixel in the image corresponding to the representation of the head, the distance to portion of the head represented by that pixel.

Once a depth map is determined for an object represented in an image, and the magnification function for the camera lens has been determined, the relative magnification of different portions of the image, corresponding to different portions of the user's face, can be determined. By knowing how much the portion corresponding to a particular feature, such as the user's nose, is magnified with respect to another feature, such as the user's ears, an adjustment can be made to reduce the magnified appearance of the nose and/or increase the magnified appearance of the ears. Various other adjustments can be made as well as should be understood in light of the teachings and suggestions contained herein. In at least some embodiments, a pair of stereo cameras can be used to determine the depth map for an object. A separate camera, such as a high-resolution, full color camera, can be used to capture a high quality image of that object, such as a selfie of a human. As long as the arrangement of the cameras is known such that the positions of objects in the cameras can be correlated, the depth map can be used to determine distances to portions of the object represented in an image captured by the high resolution camera, even though that depth map was generated using a separate pair of stereo cameras. In some embodiments, the high resolution camera can make up one of the pair of stereo cameras, or another approach (e.g., proximity sensing or structured light) can be used to determine the depth map, among other such options.

In some embodiments, a single camera can be "swept" or otherwise moved in an arc-like motion around the person to be represented in the selfie while a full video stream or series of images is captured. The user can select the image (e.g., video frame) with the preferred angle (e.g., straight on, slightly from one side, etc.), and at least a subset of the other images (or frames) in the sequence can be used to determine (or approximate) the three-dimensional profile of the face using stereoscopic techniques with multiple images from multiple angles. A device sensor such as a gyroscope or inertial sensor can be used to determine angles and/or locations for purposes of facilitating the creation of the profile. Alternatively, the user can keep the camera generally still throughout the process and swivel his or her head to create the sequence of images, selecting one for the favorite angle and some or all of the rest being used to create the three-dimensional profile of the head for the purpose of anamorphically correcting the near object-distance perspective to a more pleasing far object-distance perspective, as discussed elsewhere herein.

The representation of an object of interest, such as a human face, then can be divided, segmented, or otherwise assigned to various regions or portions of different distances in some embodiments, and a magnification or minification process applied to at least some of those regions or portions. For example, if a nose region is identified that, according to the determined distance and distance function, has a 10% magnification, the representation of that object can be minified in the image in order to attempt to minimize magnification effects. Various approaches for adjusting the size of a representation of an object in an image can be utilized, as known or used in the art, and various smoothing, filtering, or anti-aliasing approaches can be used to attempt to smooth the resulting appearance after the adjustment. The approach in some embodiments can be like cutting a portion of the image, adjusting the size of the portion, and then pasting that portion back into the image. As should be apparent, any gaps created by a minification of a portion may need to be filled in. A copy, fill, or paint process, among other such options, can be used to attempt to fill in any such gaps using the pattern or texture of nearby regions of the image. In some embodiments a "stretch" approach can be used such that any minification "pulls" nearby pixels to adjust their position to prevent gaps, as is known for image manipulation. Various other such approaches can be utilized as well as should be apparent in light of the teachings and suggestions contained herein.

Figure 7A:
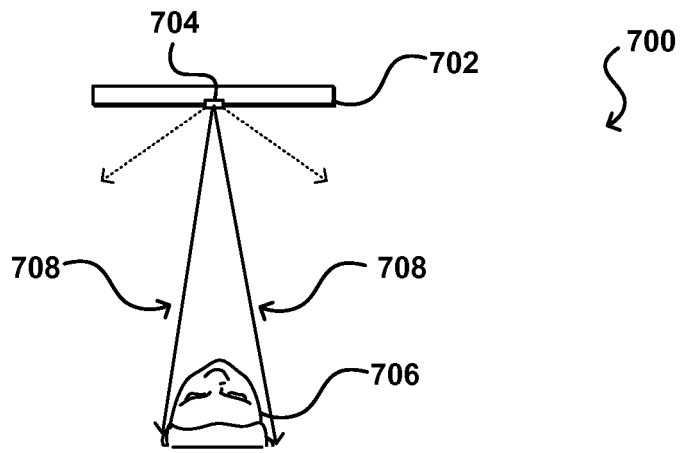
FIGS. 7(a), 7(b), and 7(c) illustrate a change in view with distance that can be addressed in accordance with various embodiments.
Figure 7B:
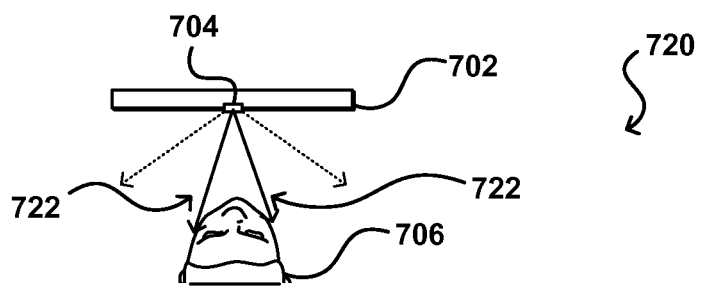
Figure 7C:
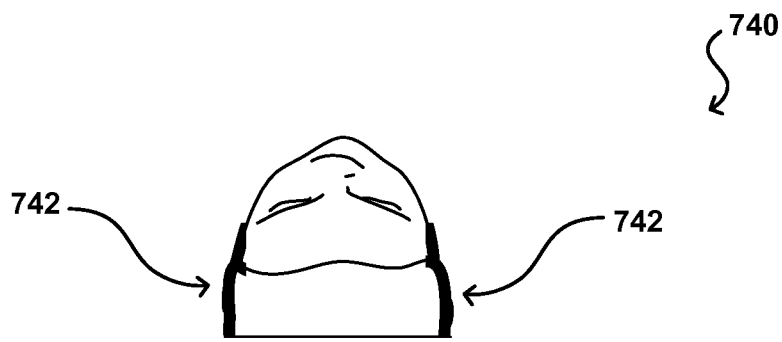

A similar process might be used for portions of the object that might not be visible due to the proximity of the object to the camera. For example, as illustrated in the situation 700 of FIG. 7(*a*), when the camera 704 of a device 702 is sufficiently far away from an object 706, the camera 704 can see in directions 708 that correspond to the outer edge of the visible portion of the object from that perspective. As the object 706 gets closer, as illustrated in the example situation 720 of FIG. 7(*b*), the camera 704 is only able to capture light in directions 722 that correspond to a portion of the user's face, and is not able to capture light from the full portion of the user's head as in FIG. 7(*a*) since portions of the head will be obscured. This can results in portions 742 of the user's head, as illustrated in the example situation 740 of FIG. 7(*c*), which may not be visible in a captured image when the camera is closer than a threshold distance from the user's head. Accordingly, approaches in accordance with various embodiments can attempt to fill this region, such as by using approaches discussed with respect to gap filling above. In some embodiments, the texture of nearby pixels can be used to attempt to expand the outer edge of the object to the location and size that can be determined using the depth map and magnification function. In other embodiments, the software and/or hardware can attempt to use other information to fill in these gaps. This can include, for example, taking data from other images that shows the portions of the head corresponding to those gaps, and then doing a texture map onto a wire frame of the head determined using the depth map and magnification function. Other such approaches can be used to attempt to fill in those portions of the user's head that are not represented in the image due to the proximity of the head to the camera at the time of image capture. In at least some embodiments, filling the contour of an object requires being able to identify the object, or type of object, or being able to piece together the contour from previous images, among other such options.

Figure 8:
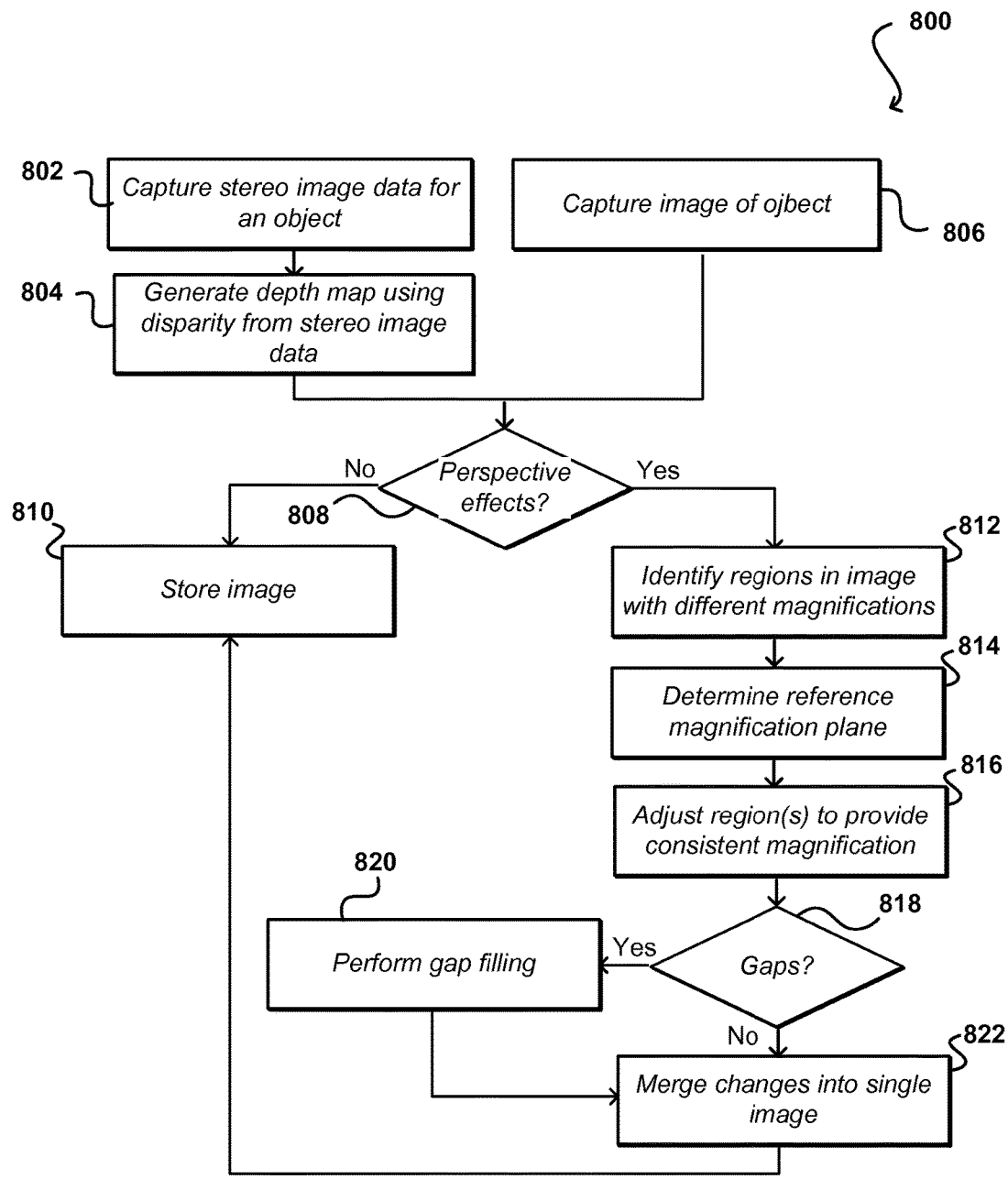
FIG. 8 illustrates an example process for reducing magnification variance in an image that can be utilized in accordance with various embodiments.

FIG. 8 illustrates an example process 800 for reducing distance-based magnification effects in an image that can be utilized in accordance with various embodiments. It should be understood that there can be additional, fewer, or alternative steps performed in similar or alternative orders, or in parallel, within the scope of the various embodiments unless otherwise stated. In this example, stereo image data is captured 802 for one or more objects, such as a user of a computing device. As discussed, the stereo image data can be captured using two or more cameras of the computing device, which can be matched or mismatched cameras in various devices, although other types of depth information can be captured and utilized in place of stereo image data as well within the scope of the various embodiments. A depth map, or other such mapping or indicator of distance, can then be generated 804 using the stereo image data, or other such data. An image of the object can be captured 806, such as may advantageously be captured at approximately the time of capturing of the stereo image data (e.g., concurrently) in order to reduce motion effects and improve correlation between objects represented in images captured by different cameras. As discussed, the image can be captured using a primary camera of the computing device, such as a high-resolution front-facing camera. In some embodiments all cameras on the device can have similar capabilities, while in other embodiments the stereo cameras might have lower resolution, color depth, or other such capabilities in order to conserve power and resources on the device. Also as mentioned, the image of the object and the stereo image data can be captured concurrently in at least some embodiments in order to reduce motion effects and/or improve accuracy.

Using distance information from the depth map, a determination can be made 808 as to whether perspective effects are likely present in the image. This determination can be made based upon factors such as the distance to the closest feature or portion of the object, as well as the distances to other portions or regions of the object. If perspective effects are determined to likely be visible, and the extent of these effects meets or exceeds an allowable deformation threshold (i.e., the magnification differences between portions of the objects exceed a determined amount), then it can be determined that perspective effects are present that should be addressed. If no such perspective effects are determined to be present, the image can be stored 810 or otherwise displayed or utilized as captured, or with any other processing normally performed for such an image. If perspective effects are determined to be present that should be addressed, various regions of the image with different magnification levels can be determined 812, such as by analyzing the depth map using a magnification function for the camera lens. Regions of a given distance associated with a given magnification level can be grouped in some embodiments into a single region for purposes of magnification compensation. As discussed, in at least some embodiments a reference magnification plane can be determined 814, which will determine the default magnification level to which other points of the object should be adjusted. One or more of these regions then can be adjusted 816 in order to bring the regions, at least the regions of an identified object, to be represented with a relatively consistent magnification.

For, or near, regions where an adjustment was made, a determination can be made 818 as to whether there are any gaps that need filling. For example, performing a minification might result in gaps between the minified region of an object and the surrounding regions. Further, edge portions of an object might not be visible due to the proximity of the camera, such that it might be advantageous to fill in these obscured gaps. Various other gaps might exist that might need to be filled or addressed as well within the scope of the various embodiments. If one or more such gaps exist, gap filling can be performed 820 using any of the approaches discussed or suggested herein. As discussed, this can involve a stretching, paint, or texture mapping process, among other such possibilities. After any gaps are filled and any magnification adjustments made, the changes can be merged 822 into a single image (if needed), and the image stored or otherwise presented as a "final" image. For example, an image determined to be a "selfie" type image can be modified and then presented for display to the user, wherein the user can decide to save or delete the image, revert the image back to its previous state, or further process the image, among other such options. In some embodiments, the user can specify the amount of magnification adjustment to be applied in the image transformation, or can be presented with different adjusted versions and able to select the preferred version, if any.

As discussed, various distance determining approaches can be used to determine a three-dimensional depth map for an object, which can include both distance and contour information. These can include, for example, one or more distance measuring components based at least in part upon stereoscopic imaging, time-of-flight proximity sensor measurements, or structured light analysis, among others. In some embodiments, a camera sensor can have pixels configured such that depth can be determined using the camera sensor itself. Stereoscopic imaging can also be performed on sequential images taken from a single camera as the user's head, the camera, or both are moved relative to each other. In this embodiment, the user selects the preferred angle to use for the selfie. In other embodiments estimates of distance can be made based upon a single image or other such data. For example, for a human face there will be a range of values for certain dimensions, such as the distance between a person's eyes, the length of their nose or lips, the size of the head, etc. By determining values of these dimensions using a representation of a head in an image, an approximate distance to the face can be determined. A depth map can be estimated by using the average dimensions of a person's face, or dimensions known for a particular user. In some embodiments, a slider bar or other such option can enable a user to make adjustments such as magnification level adjustments to one or more portions of an image, which can enable a user to not only compensate for errors in estimation, but also make adjustments that are aesthetically pleasing to the user. This can include making the user's nose slightly smaller (or larger), thinning out the user's face, adjusting the apparent ear size, etc. Such options may be particularly desirable for users with atypical facial dimensions or for representations that are at particular angles, among other possibilities.

As mentioned, various approaches can be utilized for locally and smoothly varying values of minification and magnification to an image. For example a warping transformation can be applied to identified regions of an image. One such warping transformation is a perspectival anamorphic transformation. Perspective, or oblique, anamorphosis results in projections that can distort an image by different amounts based on distance or proximity, resulting in unequal magnifications along one or more axes. The process for removing such anamorphic appearance can be referred to as a reverse anamorphic process, wherein an inverse magnification is applied to features or regions over a given distance. By applying a perspective anamorphosis or other warp process, the facial features can be rendered to appear as if the image was captured using a distant camera and the overall portrait can be perceived to be in better proportion and more pleasing to the eye. If a user control is provided, the effect can be used to adjust the apparent taking distance or to deliberately over-correct, such as to make a large nose appear smaller. Any other image adjustment processes, such as to remove angular-dependent lens distortion, can be performed in sequence or in parallel with other processes discussed herein, in order to merge all changes into a single image while reducing latency and conserving resources. In some embodiments, distortion, magnification, and/or other such effects might alternatively be addressed using a single function or process. Such transformations can also be performed on a video stream or other video data, enabling corrections to be made and displayed in near real time.

Figure 9:
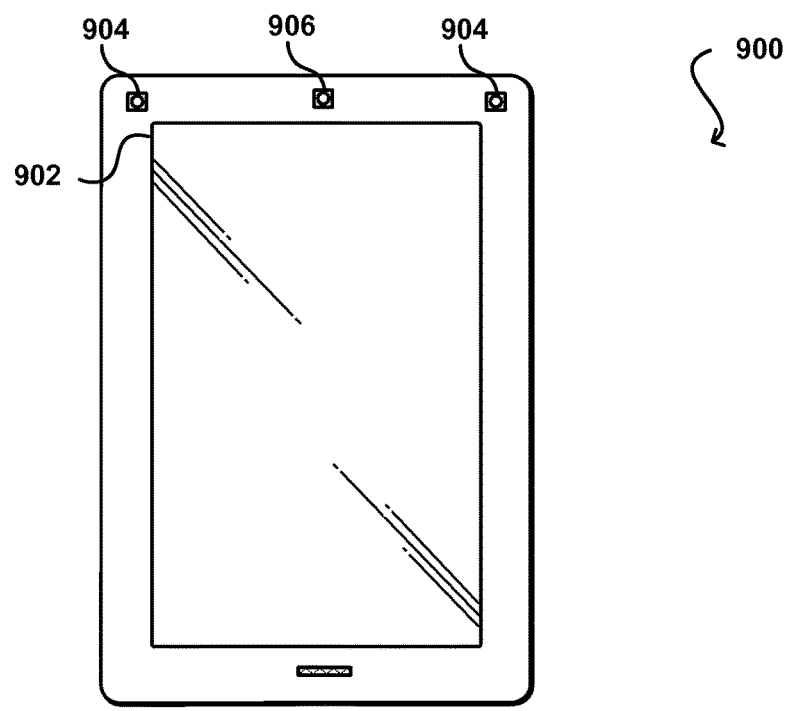
FIG. 9 illustrates an example device that can be used to implement aspects of the various embodiments.

FIG. 9 illustrates an example electronic user device 900 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 900 has a display screen 902 on the front side, which under normal operation will display information to a user facing the display screen (e.g., on the same side of the computing device as the display screen). The computing device in this example includes at least one pair of stereo cameras 904 for use in capturing images and determining depth or disparity information, such as may be useful in generating a depth map for an object. The device also includes a separate high-resolution, full color camera 906 or other imaging element for capturing still or video image information over at least a field of view of the at least one camera, which in at least some embodiments also corresponds at least in part to the field of view of the stereo cameras 904, such that the depth map can correspond to objects identified in images captured by the front-facing camera 906. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish-eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device can include at least one microphone or other audio capture device capable of capturing audio data, such as words or commands spoken by a user of the device, music playing near the device, etc. In this example, a microphone is placed on the same side of the device as the display screen, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

Figure 10:
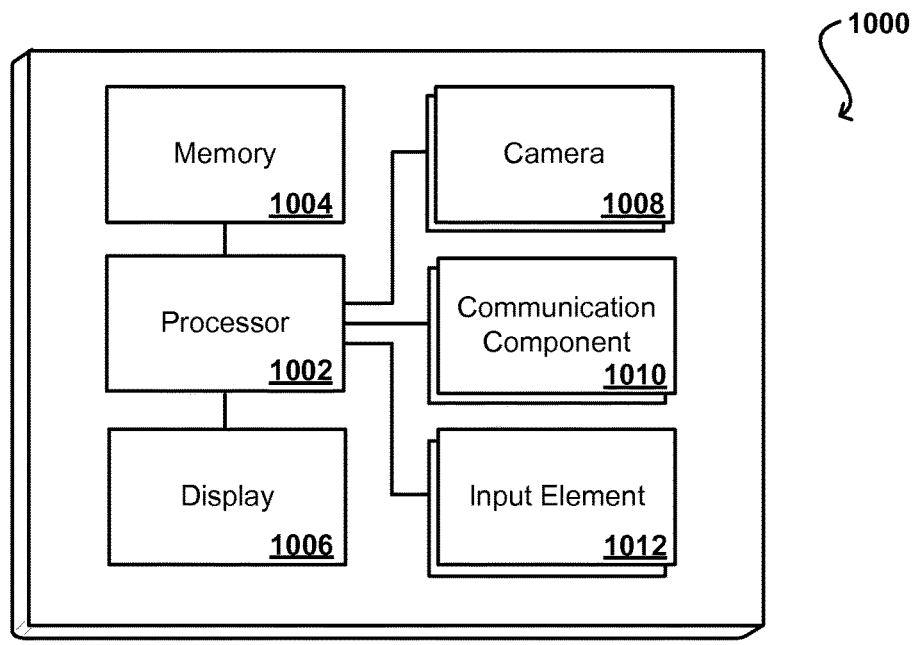
FIG. 10 illustrates example components of a client device such as that illustrated in FIG. 7.

FIG. 10 illustrates a logical arrangement of a set of general components of an example computing device 1000 such as the device 900 described with respect to FIG. 9. In this example, the device includes a processor 1002 for executing instructions that can be stored in a memory device or element 1004. As would be apparent to one of ordinary skill in the art, the device can include many types of memory, data storage, or non-transitory computer-readable storage media, such as a first data storage for program instructions for execution by the processor 1002, a separate storage for images or data, a removable memory for sharing information with other devices, etc. The device typically will include some type of display element 1006, such as a touch screen or liquid crystal display (LCD), although devices such as portable media players might convey information via other means, such as through audio speakers. As discussed, the device in many embodiments will include at least one media capture element 1008 such as a camera or infrared sensor that is able to image projected images or other objects in the vicinity of the device, or an audio capture element able to capture sound near the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can include at least one mono or stereo microphone or microphone array, operable to capture audio information from at least one primary direction. A microphone can be a uni- or omni-directional microphone as known for such devices.

In some embodiments, the computing device 1000 of FIG. 10 can include one or more communication components 1010, such as a Wi-Fi, Bluetooth, RF, wired, or wireless communication system. The device in many embodiments can communicate with a network, such as the Internet, and may be able to communicate with other such devices. In some embodiments the device can include at least one additional input element 1012 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device also can include at least one orientation or motion sensor. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor, whereby the device can perform any of a number of actions described or suggested herein.

Figure 11:
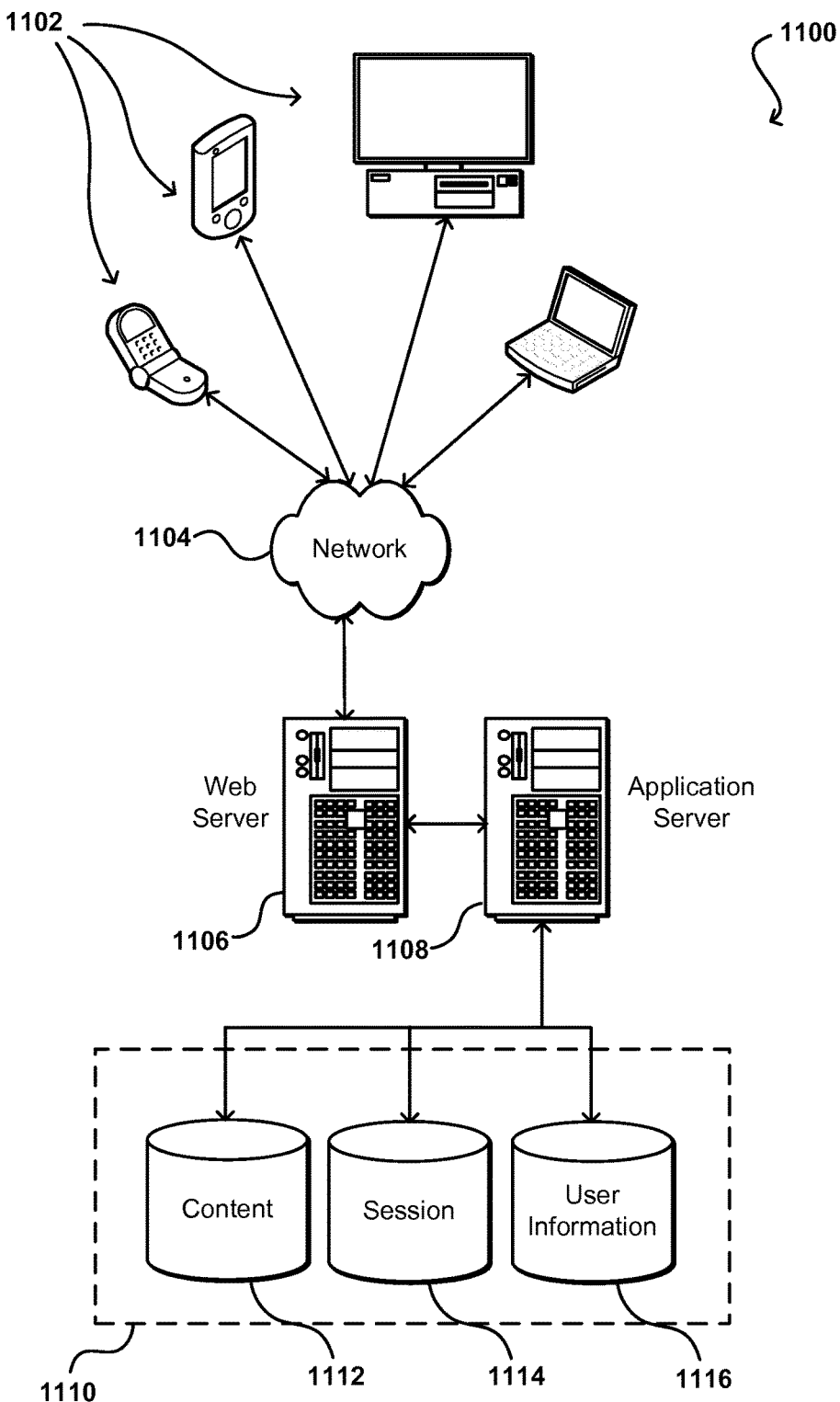
FIG. 11 illustrates an environment in which various embodiments can be implemented.

As discussed, different approaches can be implemented in various environments in accordance with the described embodiments. While many processes discussed herein will be performed on a computing device capturing an image, it should be understood that any or all processing, analyzing, and/or storing can be performed remotely by another device, system, or service as well. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 1102.

Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and non-transitory computer-readable media for containing code, or portions of code, can include any appropriate media known or used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining distance information between an object and a computing device;
   acquiring, using a camera of the computing device, first image data including a first representation of the object;
   determining a first set of pixels corresponding to a portion of the first representation of the object in the first image data;
   determining a first magnification level corresponding to the first set of pixels based at least in part upon the distance information; and
   determining a second set of pixels corresponding to a portion of a second representation of the object in second image data by applying a second magnification level to the first set of pixels.

2. The computer-implemented method of claim 1, further comprising:
   receiving a selected size adjustment; and
   determining a third set of pixels corresponding to a portion of a third representation of the object in third image data by adjusting one of the first set of pixels or the second set of pixels per the selected size adjustment.

3. The computer-implemented method of claim 1, further comprising:
   determining a perspectival anamorphic transform corresponding to the first image data based at least in part upon the distance information; and
   generating the portion of the second representation of the object in the second image data by applying the perspectival anamorphic transform to the portion of the first representation of the object in the first image data.

4. The computer-implemented method of claim 1, further comprising:
   generating a three-dimensional depth map using the distance information, the three-dimensional depth map including respective distance information for each of a plurality of feature locations of the first representation of the object in the first image data.

5. The computer-implemented method of claim 1, further comprising:
   determining a magnification function for a lens assembly of the camera, the magnification function indicating a respective magnification level for each of a plurality of distances as represented in images captured by the camera.

6. The computer-implemented method of claim 1, further comprising:
   determining the distance information using at least one distance measurement system, the at least one distance measurement system including at least one of a stereoscopic camera pair, a time-of-flight proximity sensor, or a structured light assembly.

7. The computer-implemented method of claim 1, further comprising:
   determining the distance information using at least a subset of a sequence of images acquired using the camera, each image of the subset acquired from a different relative angle to the object.

8. The computer-implemented method of claim 1, further comprising:
   determining at least one gap in pixels values in the second image data; and
   determining values for one or more pixels in the second image data corresponding to the at least one gap based at least in part upon values for a plurality of pixels surrounding the at least one gap.

9. The computer-implemented method of claim 1, further comprising:
   determining, based at least in part upon the distance information, that an outer contour of the object is not represented in the first image data;
   determining, based at least in part upon previously-acquired image data representing the object, an expected position for where the outer contour would be represented in the first image data; and
   determining values for one or more pixels near the expected position for representing the outer contour in the second image data.

10. The computer-implemented method of claim 9, further comprising:
    determining texture information for the object represented in the previously-acquired image data; and
    determining the values for the one or more pixels based at least in part upon the texture information.

11. The computer-implemented method of claim 9, further comprising:
    capturing initial image data; and
    determining additional distance information for the object based upon dimensions of the object represented in the initial image data.

12. A computing device, comprising:
    at least one processor;
    a camera; and
    memory including instructions that, when executed by the at least one processor, cause the computing device to:
       determine distance information between an object and the computing device;
       acquire, using the camera, first image data including a first representation of the object;
       determine a first set of pixels corresponding to a portion of the first representation of the object in the first image data;
       determine a first magnification level corresponding to the first set of pixels based at least in part upon the distance information; and
       determine a second set of pixels corresponding to a portion of a second representation of the object in second image data by applying a second magnification level to the first set of pixels.

13. The computing device of claim 12, wherein the instructions when executed further cause the computing device to:
    determine a warping transformation to counteract the first magnification level; and
    generate the portion of the second representation of the object in the second image data by applying the warping transformation to the portion of the first representation of the object in the first image data.

14. The computing device of claim 12, wherein the instructions when executed further cause the computing device to:

generate a three-dimensional depth map using the distance information, the three-dimensional depth map including respective distance information for each of a plurality of feature locations of the first representation of the object in the first image data.

15. The computing device of claim 12, wherein the instructions when executed further cause the computing device to:
   determine the distance information using at least one distance measurement system, the at least one distance measurement system including at least one of a stereoscopic camera pair, a time-of-flight proximity sensor, or a structured light assembly.

16. A non-transitory computer readable storage medium storing instructions that, when executed by one or more processors of a computing device, cause the computing device to:
   determine distance information between an object and the computing device;
   acquire, using a camera of the computing device, first image data including a first representation of the object;
   determine a first set of pixels corresponding to a portion of the first representation of the object in the first image data;
   determine a first magnification level corresponding to the first set of pixels based at least in part upon the distance information; and
   determine a second set of pixels corresponding to a portion of a second representation of the object in second image data by applying a second magnification level to the first set of pixels.

17. The non-transitory computer readable storage medium of claim 16, wherein the instructions when executed further cause the computing device to:
   determine at least one gap in pixels values in the second image data; and
   determine values for one or more pixels in the second image data corresponding to the at least one gap based at least in part upon values for a plurality of pixels surrounding the at least one gap.

18. The non-transitory computer readable storage medium of claim 16, wherein the instructions when executed further cause the computing device to:
   determine texture information for the object represented in previously-acquired image data;
   determine, based at least in part upon the distance information, that an outer contour of the object is not represented in the first image data;
   determine, based at least in part upon the previously-acquired image data, an expected position corresponding to where the outer contour would be represented in the first image data; and
   determine, based at least in part upon the texture information, values for one or more pixels near the expected position for representing the outer contour in the second image data.

* * * * *